US012450973B2

(12) United States Patent
Kim

(10) Patent No.: US 12,450,973 B2
(45) Date of Patent: Oct. 21, 2025

(54) HOLOGRAPHIC AND PHYSICAL MIXED-REALITY CASINO ACCOMMODATION SYSTEM AND METHOD

(71) Applicant: DoubleMe, Inc., Seoul (KR)

(72) Inventor: Heekwan Kim, Seoul (KR)

(73) Assignee: DoubleMe, Inc., South (KR)

( * ) Notice: Subject to any disclaimer, the term of this patent is extended or adjusted under 35 U.S.C. 154(b) by 282 days.

(21) Appl. No.: 18/132,378

(22) Filed: Apr. 8, 2023

(65) Prior Publication Data

US 2024/0338993 A1    Oct. 10, 2024

(51) Int. Cl.
| G07F 17/32 | (2006.01) |
| G03H 1/00 | (2006.01) |
| G06F 3/01 | (2006.01) |
| G06T 13/40 | (2011.01) |
| G06T 19/00 | (2011.01) |

(52) U.S. Cl.
CPC ....... *G07F 17/3211* (2013.01); *G03H 1/0005* (2013.01); *G06F 3/011* (2013.01); *G06T 13/40* (2013.01); *G06T 19/006* (2013.01); *G07F 17/323* (2013.01); *G07F 17/3241* (2013.01)

(58) Field of Classification Search
CPC .............. G07F 17/3211; G07F 17/323; G07F 17/3241; G03H 1/0005; G06F 3/011; G06T 13/40; G06T 19/006
See application file for complete search history.

(56) References Cited

U.S. PATENT DOCUMENTS

| 11,335,169 | B1 * | 5/2022 | Meadows | G07F 17/323 |
| 2019/0147705 | A1 * | 5/2019 | Lin | G07F 17/3293 463/11 |
| 2019/0295320 | A1 * | 9/2019 | Ghatak | G06F 3/011 |
| 2020/0118380 | A1 * | 4/2020 | Nelson | G07F 17/3216 |
| 2021/0046383 | A1 * | 2/2021 | Dhaliwal | A63F 13/537 |
| 2022/0148266 | A1 * | 5/2022 | Kim | G06V 40/171 |
| 2022/0308359 | A1 * | 9/2022 | Karafin | A63F 13/213 |
| 2023/0237868 | A1 * | 7/2023 | Lyons | G07F 17/3241 463/25 |

\* cited by examiner

*Primary Examiner* — Werner G Garner
(74) *Attorney, Agent, or Firm* — Invent Capture, LLC.; Samuel S. Cho

(57) ABSTRACT

A novel electronic system provides a holographic and physical mixed-reality (HPMR) live casino environment sharing between a casino venue in a physical casino and a remote player outside the physical casino via holographic space and gameplay live streaming. The novel system creates a live HPMR interaction between a casino dealer attending the casino venue in the physical casino and the remote player with a user-selected holographic avatar that represents either the casino dealer or the remote player in the HPMR live casino environment. The novel system dynamically generates, updates, and streams three-dimensional (3D) space, casino tables, and gameplay items of the physical casino in real time to the remote player, who can visually immerse in the holographic live stream feed and participate in the casino venue in real-time. The novel system also empowers the casino dealer to visualize the remote player as a holographic avatar in real time.

10 Claims, 8 Drawing Sheets

700
An Operational Example of Holographic and Physical Mixed-Reality Casino Accommodation System and Method in a Remote Player's House and a Physical Casino

100

A Casino Dealer or Another Casino Employee Wearing a Mixed-Reality Headset in front of a Physical Casino Table in a Physical Casino

200

A Holographic Representation of a Physical Casino Space by the Holographic and Physical Mixed-Reality Casino Accommodation System

300

A System Block Diagram for Holographic and Physical Mixed-Reality (HPMR) Casino Accommodation System A Process Flow for Holographic Avatar Creation and Holographic and Physical Mixed-Reality (HPMR) Casino Space Construction and Sharing A Scalable System User Interaction Diagram for the Holographic and Physical Mixed-Reality (HPMR) Casino Accommodation System A Remote Physical Player Visualizing a Holographic Casino Environment Created by the Holographic and Physical Mixed-Reality Casino Accommodation System

700

An Operational Example of Holographic and Physical Mixed-Reality Casino Accommodation System and Method in a Remote Player's House and a Physical Casino A Method of Operating the Holographic and Physical Mixed-Reality (HPMR) Casino Accommodation System

HOLOGRAPHIC AND PHYSICAL MIXED-REALITY CASINO ACCOMMODATION SYSTEM AND METHOD

BACKGROUND OF THE INVENTION

The present invention generally relates to holographic and physical mixed-reality visualizations of a physical casino event for remote participants located outside the physical casino. In particular, the present invention relates to real-time and live mixed-reality casino environment sharing between a casino dealer working at the physical casino event and one or more remote participants via bilateral real-time holographic visualizations.

More specifically, the present invention relates to a holographic and physical mixed-reality (HPMR) casino accommodation system and a method of its operation that provide real-time and live mixed-reality casino environment sharing between the casino dealer working at the physical casino event and one or more remote participants via two-way real-time holographic visualizations, wherein the first way involves each remote participant visualizing the casino dealer and the physical casino event in real time as holograms, and the second way involves the casino dealer working at the physical casino event visualizing selected remote participants as holograms in real time. In addition, the present invention also relates to immersive mixed-reality visualization of real physical and holographic elements in a designated real physical space.

In recent years, virtual reality (VR) and augmented reality (AR) applications are increasingly gaining popularity and relevance in electronic user applications. For example, VR headsets for computers and portable devices are able to provide interactive and stereoscopic gaming experiences, training simulations, and educational environments for users wearing the VR headsets. In another example, augmented reality (AR) mobile applications are designed to add texts, descriptions, or added (i.e. "augmented") digitized materials to physical objects if a user wears AR goggles or utilizes AR-compatible mobile applications executed in portable devices. For one of ordinary skill in the art, virtual reality (VR) refers to a completely computer-generated synthetic environment with no direct correlations to a real physical space or a real physical object, while augmented reality (AR) refers to descriptive digital materials that are displayed next to a machine-recognized real physical object to add or "augment" more information to the physical reality.

However, conventional VR and AR applications are unable to provide seamless integration of ultra-high resolution and lifelike holographic three-dimensional objects juxtaposed to real physical objects located in a particular physical location for interactive and immersive curation with both synthetic and real objects, because the conventional VR applications merely provide user interactions in a purely computer-generated synthetic (i.e. virtual) environment with no correlation to physical objects in a real physical space, while the conventional AR applications merely provide additional informational overlays (i.e. information augmentation) to machine-recognized real physical objects via partially-transparent AR goggles or AR-enabled camera applications in mobile devices.

A recent evolution of conventional VR and AR applications has resulted in an innovative intermixture of computer-generated lifelike holographic objects and real objects that are synchronized and correlated to a particular physical space (i.e. as a "mixed-reality" (MR) environment) for immersive user interactions during the user's visit to the particular physical space. Although mixed-reality (MR) applications have been created and deployed in limited and experimental capacity for tourism of museums, exhibits, and other landmarks, they have not been utilized in physical casino industry.

The current state of the art for users to participate in casino events falls into two distinct categories: (1) making a physical visit to a physical casino (e.g. traveling to a casino hotel resort in Las Vegas), or (2) logging into an online casino through the Internet. Requiring a physical visit to a physical casino to a customer presents fundamental disadvantages that are hard to overcome: scarce availability of time, travel budget limitations, customer-specific mobility challenges, and general logistical inconvenience associated with travel. Furthermore, conventional online Internet casinos present fundamental challenges related to credibility, venue transparency, fairness, and legal compliance. In addition, customer experiences associated with conventional online casinos are limited to accessing a computerized casino venue interface presented on a web browser or a mobile device application, which fail to provide an immersive, three-dimensional, and real-time interactive experience with a physical casino dealer and other customers who are physically attending the casino venue.

Therefore, it may be advantageous to provide a novel electronic system and a related method of operation that provide a real-time and live mixed-reality (MR) casino environment sharing between a casino dealer working at a physical casino and one or more remote participants via bilateral real-time three-dimensional (3D) holographic visualizations.

In particular, it may be advantageous to provide a novel holographic and physical mixed-reality (HPMR) casino accommodation system and a method of its operation that enable real-time and live mixed-reality casino environment sharing between the casino dealer working at a physical casino event and one or more remote participants via two-way real-time holographic visualizations, wherein the first way involves each remote participant visualizing the casino dealer and the physical casino event in real time as holograms, and the second way involves the casino dealer working at the physical casino event visualizing selected remote participants as holograms in real time.

In addition, in some instances, it may also be advantageous to enable the novel holographic and physical mixed-reality (HPMR) casino accommodation system and its method of operation to provide real-time interactivity and visualizations among remote participants and physical visitors gathered around the same physical casino event for the remote participants' added immersive customer experience, wherein each remote participant and each physical visitor can visualize each other in real time, as if they are gathered around the same physical casino event together in person.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In a preferred embodiment of the invention, a method of operating a holographic and physical mixed-reality (HPMR) casino accommodation system is disclosed. This method comprises the steps of: (1) activating a holographic user interface to a remote player wearing a first mixed-reality head-mounted display (HMD); (2) prompting the remote player to log into the holographic user interface to select an HPMR casino application, which in turn activates the HPMR casino accommodation system for the remote player and initializes a holographic cube environment; (3) from a visual perspective of the remote player wearing the first mixed-reality HMD, superimposing the holographic cube environment on the remote player located outside of any physical casinos; (4) allowing the remote player, via the holographic user interface, to choose a privacy-protecting humanized hologram as the remote player's privacy-protecting holographic avatar; (5) allowing the remote player, via the holographic user interface, to select a desirable physical casino among a plurality of physical casino choices in the holographic user interface visualized within the holographic cube environment; (6) activating a dealer's visual perspective of a HPMR live casino environment for a casino dealer wearing a second mixed-reality HMD at the desirable physical casino to visualize the remote player's privacy-protecting holographic avatar participating at a physical casino table, which is officiated by the casino dealer, wherein the casino dealer simultaneously visualizes the remote player's privacy-protecting holographic avatar as well as physical people and physical objects at the physical casino table through the second mixed-reality HMD; and (7) activating a remote player's visual perspective of the HPMR live casino environment for the remote player wearing the first mixed-reality HMD, wherein the activation of the remote player's visual perspective empowers the remote player to visualize the casino dealer's holographic avatar, a holographic version of the physical casino table, holographic versions of the physical objects at the physical casino table, and local physical objects at the remote player's location, which is outside of any physical casinos.

DETAILED DESCRIPTION

Figure 1:
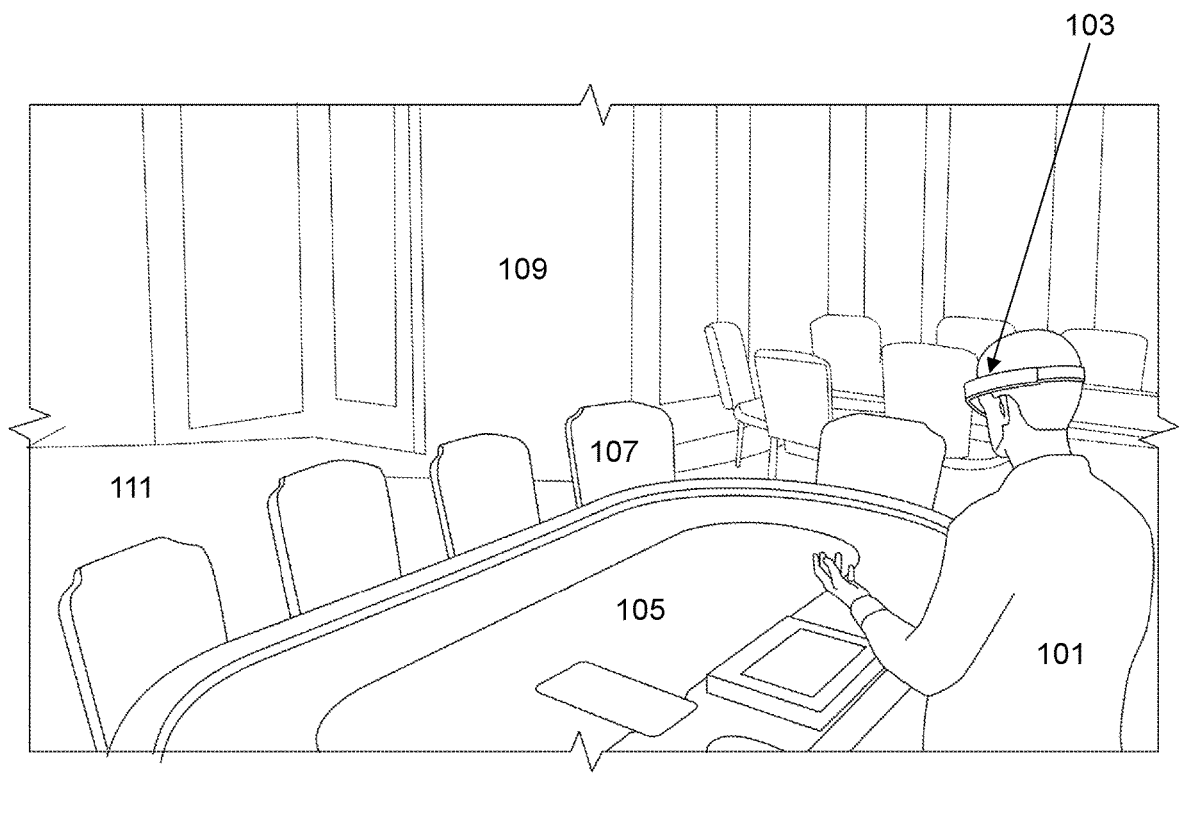
FIG. 1 shows a casino dealer or another casino employee wearing a mixed-reality (MR) headset in front of a physical casino table in a physical casino, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more electronic systems and methods for holographic and physical mixed-reality (HPMR) casino space synthesis, visualization, and participation and gameplay management. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

One objective of an embodiment of the present invention is to provide a novel electronic system and a related method of operation that enable real-time and live mixed-reality casino environment sharing between a casino dealer working at a physical casino event and one or more remote participants via two-way, bilateral real-time holographic visualizations, wherein the first way involves each remote participant visualizing the casino dealer and the physical casino event in real time as holograms, and the second way involves the casino dealer working at the physical casino event visualizing selected remote participants as holograms in real time.

Furthermore, another objective of an embodiment of the invention is to provide a novel electronic system and a related method of operation that enable real-time interactivity and visualizations among remote participants and physical visitors gathered around the same physical casino event for the remote participants' added immersive customer experience, wherein each remote participant and each physical visitor can visualize each other in real time, as if they are gathered around the same physical casino event together in person.

Another objective of an embodiment of the present invention is to provide a novel electronic system and a related method of operation that improve customer convenience, customer participation rates, and cost efficiencies of operating a physical casino by graphically synthesizing a holographic and physical mixed-reality (HPMR) casino space that can be visualized in real time by casino dealers, remote participants, and physical visitors for immersive and interactive casino event participation and gameplay.

Another objective of an embodiment of the present invention is to provide a novel electronic system and a related method of operation that enable an immersive mixed-reality visualization of real physical and holographic elements in a designated real physical space.

For the purpose of describing the invention, a term referred to as "mixed reality," or "MR," as an acronym, is defined as an intermixture of computer-generated lifelike holographic objects and real physical objects that are synchronized and correlated to a particular physical space (e.g. a physical casino) for immersive user interactions during the user's actual or virtual visit to the particular physical space. Typically, unlike conventional augmented reality applications, the computer-generated lifelike holographic objects are ultra high-resolution (e.g. 4K/UHD) or high-resolution (e.g. HD quality or above) three-dimensional synthetic objects that are intermixed and/or juxtaposed to real physical objects, wherein a viewer immersed in the mixed-reality environment is often unable to distinguish the synthetic nature of the computer-generated lifelike holographic objects and the real physical objects provided by the mixed-reality environment. The viewer immersed in the mixed-reality environment may be locally present at the particular physical space (e.g. the physical casino), which is correlated and synchronized with the computer-generated lifelike holographic objects and the real physical objects in one or more mixed-reality artificial layers superimposed on the particular physical space. Alternatively, the viewer may also be remotely located in a different physical space (e.g. the viewer's own residence) but still correlated and synchronized with the particular physical space (e.g. the physical casino) to be immersed in a holographic and physical mixed-reality (HPMR) environment that provides the computer-generated lifelike holographic objects, wherein the HPMR environment is synthesized and visualized in real time to the viewer, and allows the viewer to participate in events or games physically occurring at the particular physical space (e.g. the physical casino). Typically, the viewer is required to wear a mixed-reality recording headset or another wearable computing device to visualize and participate in the HPMR environment that presents games or events occurring in real time at the particular physical space.

Moreover, for the purpose of describing the invention, a term referred to as "casino dealer" is defined as a casino game event operator, who is typically hired by a physical casino to officiate, moderate, supervise, and/or present a particular casino game to participating customers, who may be physically attending the physical casino or remotely attending through an HPMR environment. The casino dealer, in context of various embodiments of the present invention, is physically present at the physical casino to officiate a particular casino game (e.g. a blackjack or poker table, a roulette wheel, etc.). In order to visualize, communicate, and enable participation of remote participants as holograms through an HPMR environment in real time, the casino dealer may wear a mixed-reality (MR) headset or another wearable computing device while officiating at the particular casino game occurring at the physical casino. Furthermore, in a preferred embodiment of the invention, the casino dealer may also act as a mixed-reality experience designer, who walks around the physical casino while wearing or carrying a mixed-reality recording headset to create a computer graphics-generated holographic and physical mixed-reality (HPMR) environment for remotely-located participants' virtualized visit to the physical casino before a particular casino game begins. In an alternate embodiment of the invention, instead of acting as a mixed-reality experience designer himself/herself, the casino dealer can simply select a particular HPMR environment from a pre-synthesized and stored library of HPMR environments previously created for the physical casino, and link up with the remote participants holographically and aurally during gameplay of a particular casino game.

In addition, for the purpose of describing the invention, a term referred to as "remote participants," "remotely-located participants," or "remote players," is defined as a virtual "off-site" visitor to a physical casino and a casino game event physically hosted by the physical casino via computerized visual simulations, wherein the remote participation is enabled by a holographic and physical mixed-reality (HPMR) environment that simulates an in-person visit to the casino game event via an intermixture of computer-generated graphics, holograms, and physical objects to present immersive three-dimensional (3D) visualizations of the casino game event and the physical casino, in real time. A remote participant, by definition, is not on-site at the physical casino, but is empowered with real-time holographic visualization of the physical casino and related casino game events. In a preferred embodiment of the invention, the remote participant can interact and communicate with a casino dealer through the HPMR environment in real time, and participate in a casino game of his/her choice. In some embodiments, the remote participant may also be allowed to visualize and interact with physical visitors holographically and aurally in real time, while the casino dealer observes all participants' (i.e. both in-person and remote) behaviors as an officiator of a particular casino game event.

In addition, for the purpose of describing the invention, a term referred to as a "mixed-reality artificial layer" is defined as a computer-generated graphics layer in which mixed-reality objects (MROs) and mixed-reality holographic humans (e.g. casino dealers, holographic remote participants, etc.) are created and positioned by a holographic and physical mixed-reality casino accommodation system onto virtual coordinates, which correlate to a particular physical space of a viewer's interest, such as a physical casino game event (e.g. a blackjack or poker table) at a physical casino (e.g. a renowned casino resort in Las Vegas).

Moreover, for the purpose of describing the invention, a term referred to as "hologram" is defined as a three-dimensional holographic object configured to be displayed from a head-mounted display (HMD) device, a mobile device executing a mixed-reality visual mobile application, or another electronic device with a visual display unit. Typically, a hologram is capable of being animated as a three-dimensional element over a defined period of time. Examples of holograms utilized in mixed-reality environments generated by a holographic and physical mixed-reality casino accommodation system include, but are not limited to, a humanized holographic casino dealer, a remote holographic participant, a holographic casino building structure, a holographic casino table, a holographic roulette wheel, a holographic slot machine, cards, dice, game chips, or another casino game object as a hologram which can be intermixed with or juxtaposed to physical objects for seamlessly-vivid visualizations of both artificial holograms and physical objects.

In addition, for the purpose of describing the invention, a term referred to as "three-dimensional model," or "3D model," is defined as one or more computer-generated three-dimensional images, videos, or holograms. In a preferred embodiment of the invention, a computerized 3D model is created as a hologram after multi-angle video data are extracted, transformed, and reconstructed by three-dimensional graphics processing algorithms executed in a computer system or in a cloud computing resource comprising a plurality of networked and parallel-processing computer systems. The computer-generated 3D model can then be utilized as a mixed-reality object (MRO) or a humanized mixed-reality hologram (MRH) in a mixed-reality artificial layer superimposed on a particular physical space correlated by virtual coordinates from a holographic and physical mixed-reality casino accommodation system.

Moreover, for the purpose of describing the invention, a term referred to as "cloud" is defined as a scalable data network-connected and/or parallel-processing environment for complex graphics computations, transformations, and processing. The data network-connected and/or parallel-processing environment can be provided using a physical connection, a wireless connection, or both. For example, a cloud computing resource comprising a first cloud computing server, a second cloud computing server, and/or any additional number of cloud computing servers can each extract and transform a portion of multi-angle video data simultaneously as part of a scalable parallel processing algorithm, which performs temporal, spatial, and photometrical calibrations, and executes depth map computation, voxel grid reconstruction, and deformed mesh generation. A scalable number of cloud computing servers enables a real-time or near real-time transformation and reconstruction of 3D models after consumer video recording devices transmit multi-angle video data to the cloud computing resource.

FIG. 1 shows a casino dealer (101) or another casino employee wearing a mixed-reality (MR) headset (103) in front of a physical casino table (105) in a physical casino (100), in accordance with an embodiment of the invention. In a preferred embodiment of the invention, interior structures of the physical casino (100), such as a sidewall (109) and a floor (111), as well as objects associated with a casino game event, such as the physical casino table (105) and chair(s) (107) for blackjack or poker games, are scanned and recorded by the casino dealer (101) or another casino employee wearing the MR headset (103) before or during a casino gameplay. In the preferred embodiment of the invention, the casino dealer (101) walks around the physical casino (100) and scans the interior structures (e.g. 109, 111) of the physical casino (100) as well as the objects (e.g. 105, 107) associated with a casino game event with an MR recording device (e.g. the MR headset (103)), which is configured to record the interior structures and the objects associated with the casino game event as three-dimensional (3D) images.

In the preferred embodiment of the invention, a holographic and physical mixed-reality (HPMR) casino accommodation system is operatively connected to the MR headset (103) worn by the casino dealer (101), and is configured to synthesize computer-generated holographic interior structures and objects of the physical casino (100) based on the walk-through motions visualized by the MR headset (103) on the casino dealer (101). In some instances, physical visitors sitting on the chair(s) (107) or other physical bystanders may also be synthesized as holograms as part of an HPMR casino environment by the holographic and physical mixed-reality casino accommodation system, and subsequently visualized by remote participants of a casino event. The captured field of vision from the MR headset (103) worn by the casino dealer (101) then undergoes graphical image processing and transformations in the holographic and physical mixed-reality casino accommodation system to produce holographic space structures and holographic objects that correspond to the physical casino (100). The holographic space structures and objects synthesized by holographic and physical mixed-reality casino accommodation system are then real-time streamed to a remote participant's separate physical space, which is a different location from the location of the physical casino (100).

Figure 6:
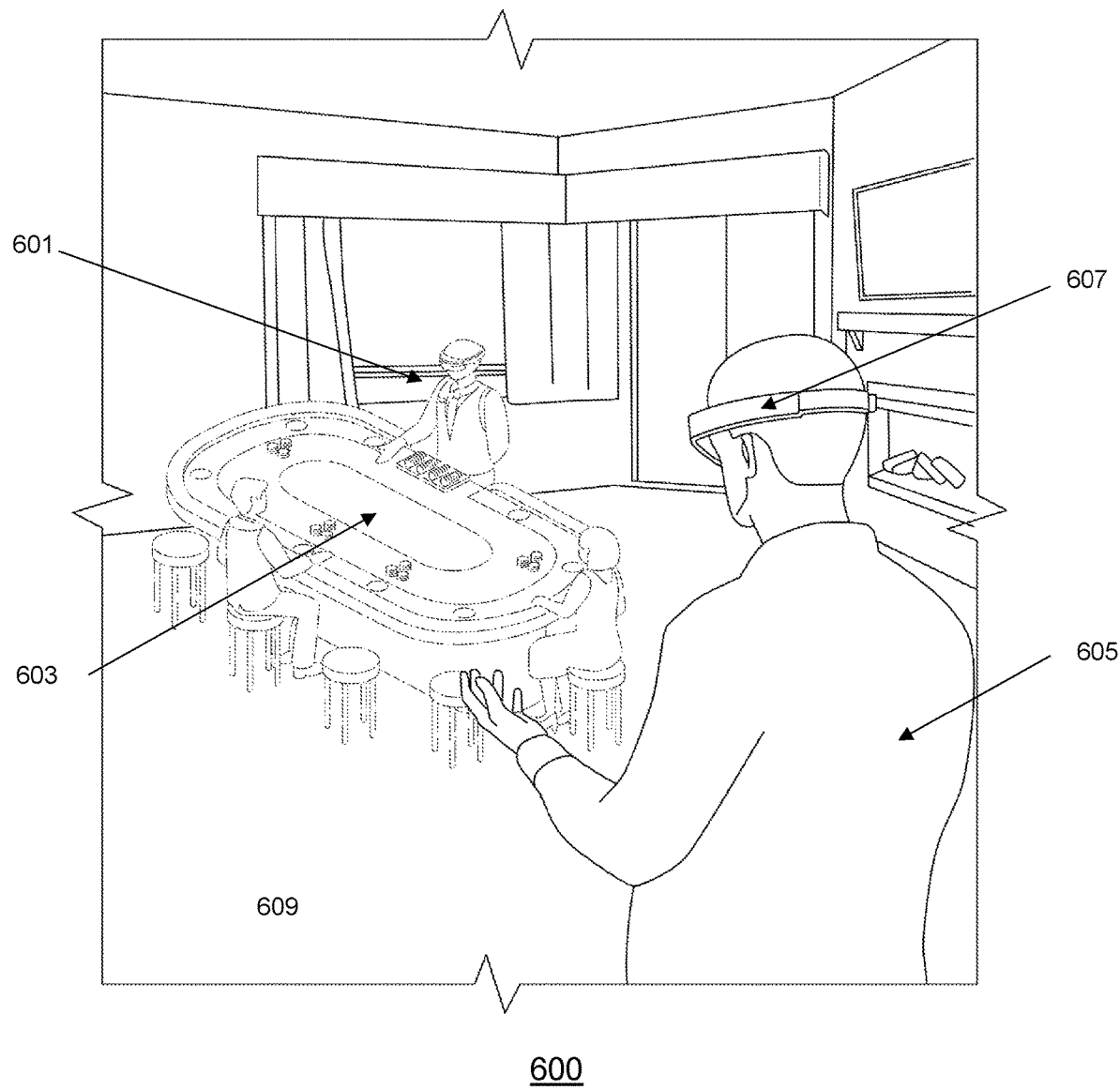
FIG. 6 shows an example of a remote physical player visualizing a holographic casino environment created by the holographic and physical mixed-reality (HPMR) casino accommodation system, in accordance with an embodiment of the invention.
Figure 7:
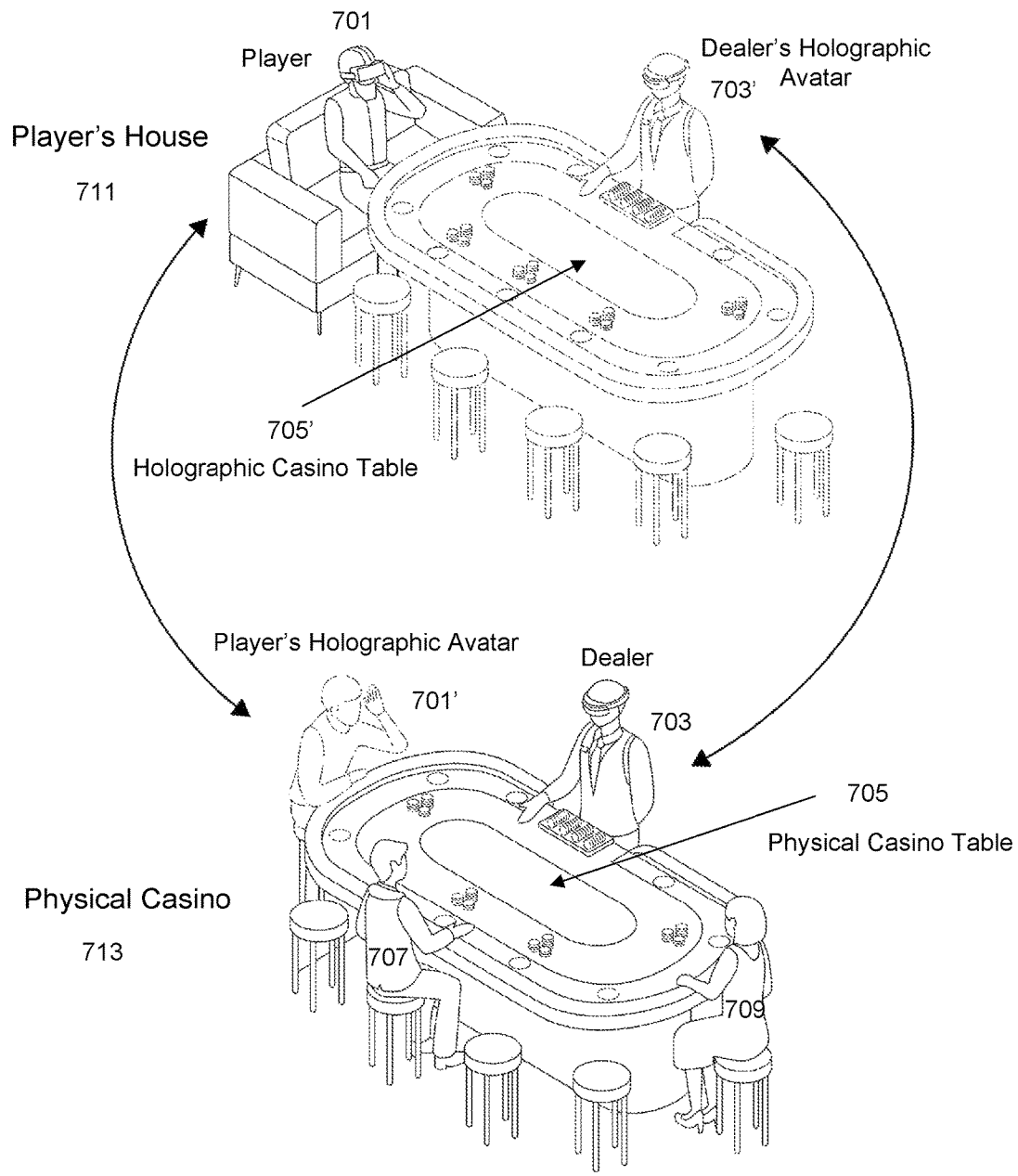
FIG. 7 shows an operational example of holographic and physical mixed-reality (HPMR) casino accommodation system and method in a remote player's house and a physical casino, in accordance with an embodiment of the invention.
Figure 8:
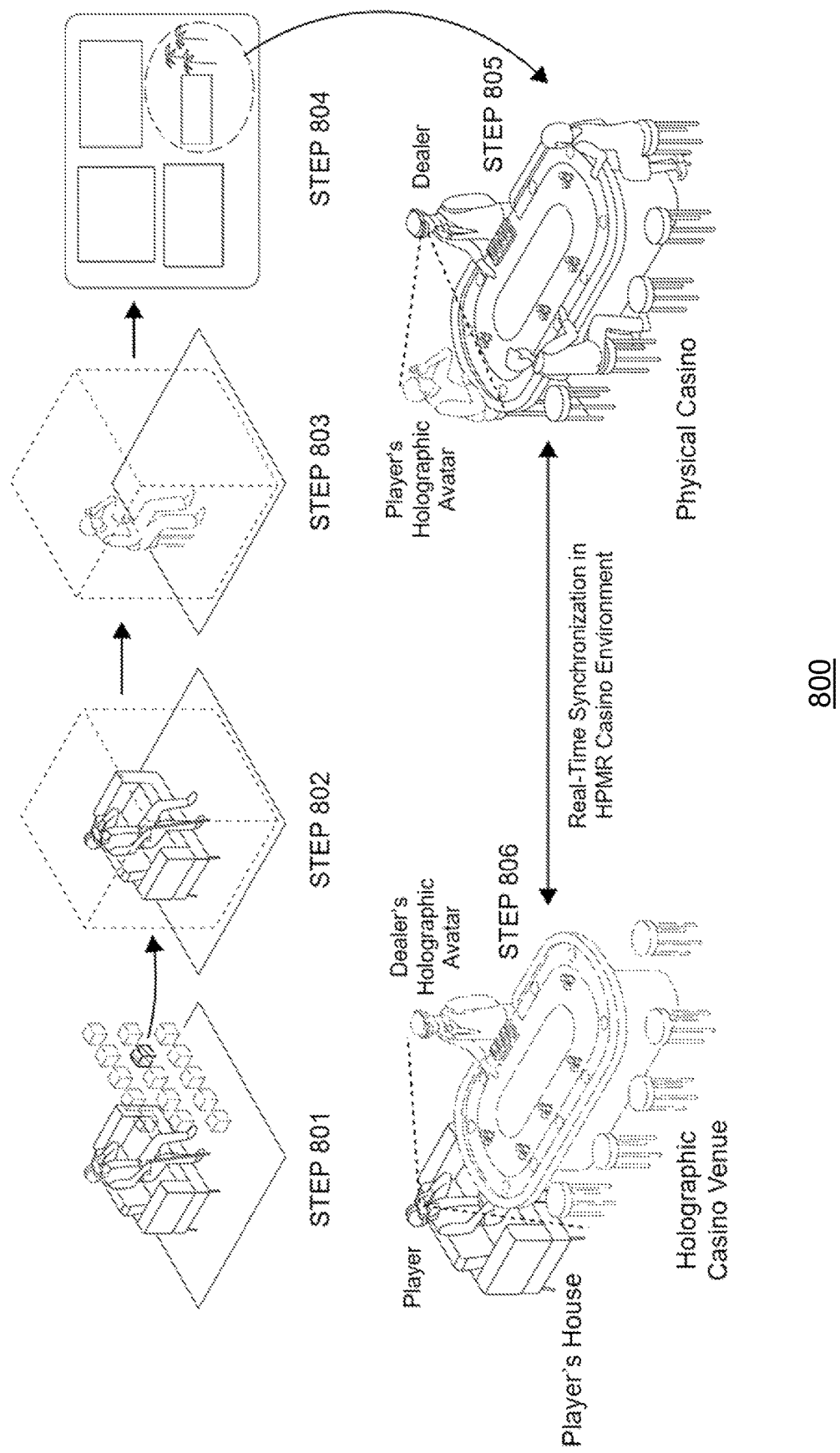
FIG. 8 shows a method of operating the holographic and physical mixed-reality (HPMR) casino accommodation system, in accordance with an embodiment of the invention.

If the remote participant is wearing a head-mounted display (HMD) or utilizing another device capable of visualizing mixed-reality environments, as shown in FIGS. 6-8, the remote participant is able to see the holographic space of the physical casino (e.g. 100), related structures (e.g. 109, 111), objects (e.g. 105, 107), and the casino dealer (e.g. 103) as holograms, which are superimposed to the remote participant's separate physical space, such as his/her own residence. This off-site-based virtualized visit to the physical casino (100) via the HMD worn in the separate physical space of the remote participant increases game participation rates to the physical casino (100), which in turn improves the casino's operating profits and economy of scale. The remote participant, in turn, is empowered with convenient casino event participation through immersive 3D mixed-reality environments that mirror the physical casino in real time, regardless of the remote participant's actual physical location. Therefore, the holographic and physical mixed-reality casino accommodation system provides a synergistic win-win solution for both casino operators and casino customers by improving customer convenience, customer experience, and operational and travel cost structures.

The holographic and physical mixed-reality casino accommodation system is configured to provide immersive holographic and physical mixed-reality (HPMR) environments in a scalable manner to any number of remote participants, wherein each instance of the HPMR environment provided to each remote participant to a casino event corresponds to a unique and individualized HPMR instance of the actual physical casino holding the event, with real-time 3D holographic visualization of the casino dealer, casino tables, chairs, and gameplay objects (e.g. cards, game chips, and dice), as if the remote participant is virtually transported to the physical casino, while simultaneously still being able to visualize real, non-holographic objects (e.g. drinks and food in the remote participant's living room, living room furniture, personal pets, etc.) in the remote participant's current location, which may be his/her residence or another comfortable location external to the physical casino.

Figure 2:
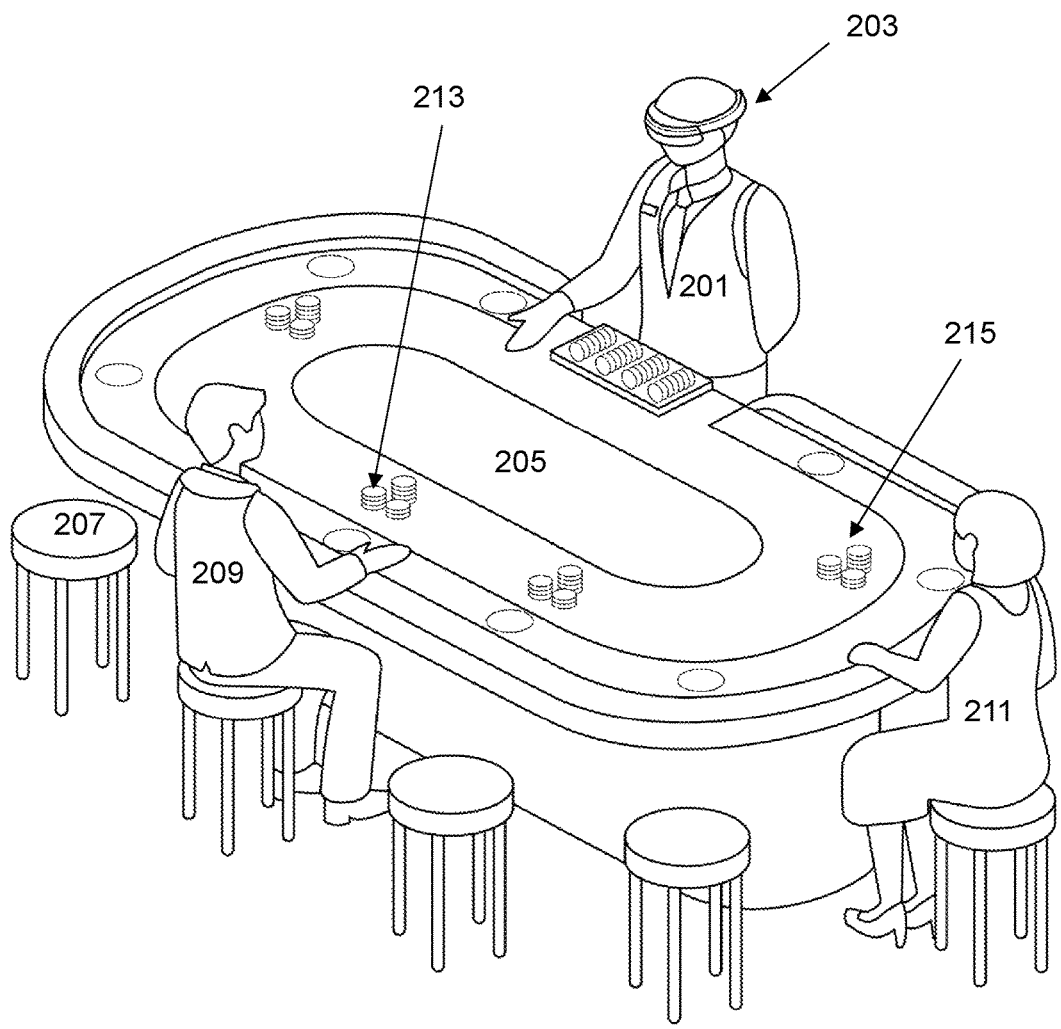
FIG. 2 shows a holographic representation of a physical casino space by a holographic and physical mixed-reality (HPMR) casino accommodation system, in accordance with an embodiment of the invention.

FIG. 2 shows a holographic representation (200) of a physical casino space by a holographic and physical mixed-reality (HPMR) casino accommodation system, in accordance with an embodiment of the invention. The holographic representation (200) as illustrated in FIG. 2 is an example of holographic visualization from a remote participant's visual perspective, when he/she is wearing an MR headset to immerse in the HPMR casino environment. The remote participant is able to visualize a casino dealer (201) wearing a casino dealer's MR headset (203), a casino game table (205), a plurality of game chips (213, 215) on the casino game table (205), chair(s) (207) surrounding the casino game table (205), and optionally, one or more physical participants (209, 211) physically sitting in front of the casino game table (205) as the holographic representation (200) in the remote participant's field of vision.

In a preferred embodiment of the invention, the holographic representation (200) of the physical casino space is synthesized and streamed by the HPMR casino accommodation system to the remote participant for visualization, which is intermixed with physical objects in the remote participant's location to constitute the holographic and physical mixed-reality (HPMR) environment in real time, with synchronization delays between the physical casino and the remote participant's location being preferably less than half a second. Furthermore, in a typical mode of operation, the casino dealer (201) and the remote participant can visualize and communicate verbally to each other in the HPMR environment provided by the HPMR casino accommodation system.

Figure 3:
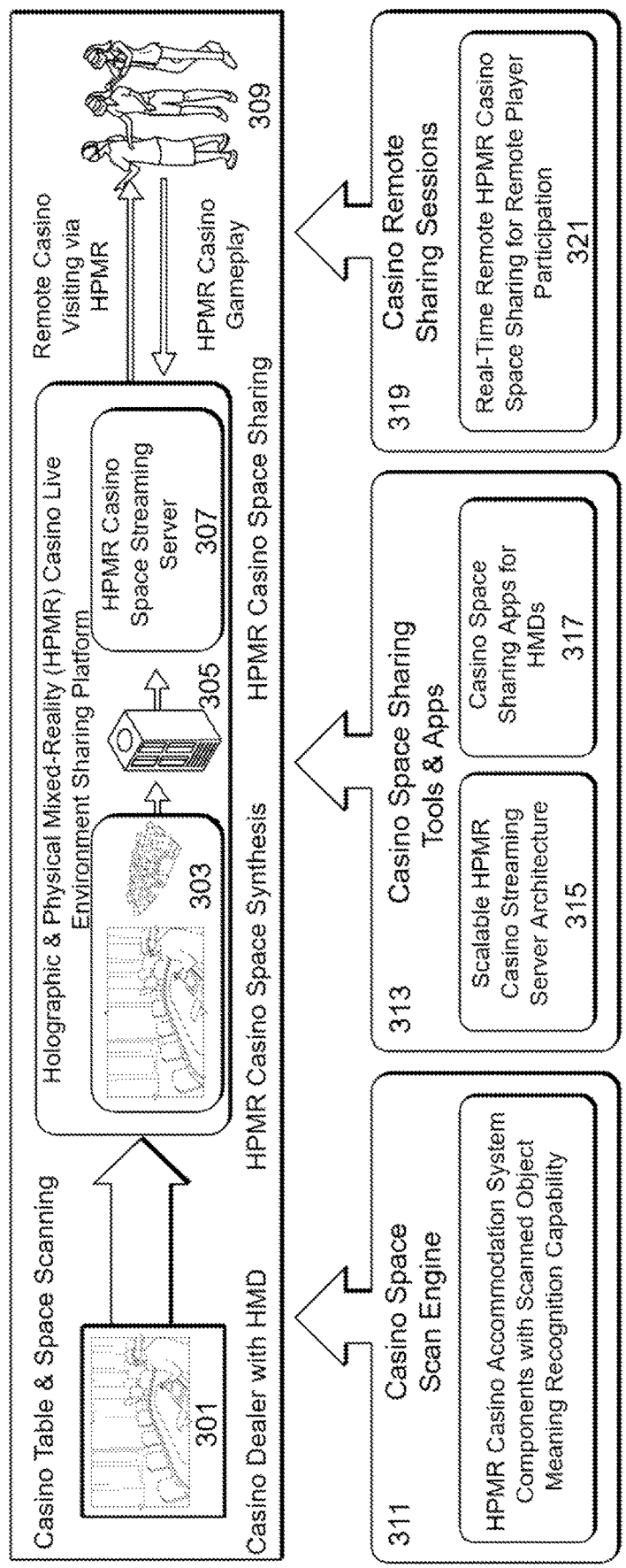
FIG. 3 shows a system block diagram for the holographic and physical mixed-reality (HPMR) casino accommodation system, in accordance with an embodiment of the invention.

FIG. 3 shows a system block diagram (300) for the holographic and physical mixed-reality (HPMR) casino accommodation system, in accordance with an embodiment of the invention. The HPMR casino accommodation system in this embodiment comprises a mixed-reality (MR) recording device worn or carried by a casino dealer (301), a casino space scan engine (311) operatively connected to the MR recording device, a holographic and physical mixed-reality (HPMR) live casino environment sharing platform (303, 305, 307) that includes an HPMR casino space synthesis module (303), a graphics processing server (305), and an HPMR casino space streaming server (307), and a head-mounted display (HMD) device worn by a remote participant (309), as shown in FIG. 3.

In the preferred embodiment of the invention, the casino space scan engine (311) may further incorporate a walkthrough map creation engine and 3D casino map databases, and is capable of recognizing and interpreting meaning of a scanned object or structure of a physical casino. The intelligent machine recognition and interpretation of scanned objects and structures during the casino dealer's walkthrough, as previously illustrated in FIG. 1, enable real-time and dynamic visualizations of the hologram-converted casino structures and objects as well as real-time verbal communications between the casino dealer (301) and the remote participant (309) during a live casino event. The real-time and dynamic visualizations of the hologram-converted casino structures, objects, and people from the physical casino simulate the experience of visiting the physical casino in real-time for the remote participant (309), aided by the presence of the hologram-converted on-site casino dealer (301) in the HPMR live casino environment synthesized and managed by the HPMR casino accommodation system.

Continuing with the system block diagram (300) for the HPMR casino accommodation system illustrated in FIG. 3, the holographic and physical mixed-reality (HPMR) live casino environment sharing platform (303, 305, 307) incorporates the HPMR casino space synthesis module (303) that creates 3D holographic structures and objects after receiving digitized visualization data from the mixed-reality (MR) recording device worn or carried by the casino dealer (301). The computer graphics generation of the 3D holographic structures and objects by the HPMR casino space synthesis module (303) is at least partly executed by the graphics processing server (305) for computer graphics generation, conversion, transformations, and high-resolution synthesis of various holograms that correspond to the interior structures of the physical casino, the objects (e.g. furniture, gameplay items, etc.) contained in the physical casino, and optionally, one or more in-person participants inside the physical casino. The various holograms created by the HPMR casino space synthesis module (203) and the graphics processing server (205) constitute the holographic space representing the physical casino, which is subsequently "teleported" to the remote participant's (309) physical location by HPMR space streaming initiated by the HPMR casino space streaming server (307), as shown in FIG. 3.

In case of humans represented by holograms in the HPMR live casino environment, a holographic avatar that represents each individual (e.g. a casino dealer, an in-person participant, a remote participant, a bystander, etc.) may be a visually-similar holographic manifestation of that individual in one embodiment, or a visually-different holographic manifestation of that individual for privacy protection, in an alternate embodiment of the invention. In case of the alternate embodiment of the invention with the visually-different holographic manifestation of that individual for privacy protection, each individual may have an option to choose a particular avatar from an existing library of avatars available for visualization by participants in the HPMR live casino environment.

In the preferred embodiment of the invention, the holographic and physical mixed-reality (HPMR) live casino environment sharing platform (303, 305, 307) also incorporates a casino space sharing tool and apps (313) that include a scalable HPMR casino streaming server architecture (315) and a casino space sharing apps (317) for head-mounted displays (HMDs) worn by a plurality of participants, such as remote participants, in-person participants, onsite bystanders, and casino dealers. In one embodiment, the casino space sharing apps (317) may be executed by each HMD operatively connected to the HPMR casino accommodation system. In another embodiment, the casino space sharing apps (317) may be executed by a smart phone or another mobile device operatively connected to the HPMR casino accommodation system.

Continuing with the system block diagram (300) of the HPMR casino accommodation system as shown in FIG. 3, the scalable HPMR casino streaming server architecture (315) assigns a variable number of hologram-streaming computer servers, depending on a current number of HPMR casino streaming requests by the plurality of remote participants. For instance, if a larger number of remote participants is requesting hologram-based virtualized visit to the physical casino at a given time frame, the scalable HPMR casino streaming server architecture (315) activates a correspondingly-increased number of HPMR casino space streaming servers (307) for real-time live HPMR casino space sharing with the larger number of remote participants. Likewise, if a smaller number of remote participants is requesting hologram-based virtualized visit to the physical casino at a given time frame, the scalable HPMR casino streaming server architecture (315) correspondingly reduces the number of active HPMR casino space streaming servers (307) for real-time live HPMR casino space sharing to optimize network traffic and system resource management for the HPMR casino accommodation system.

Furthermore, in the preferred embodiment of the invention, the casino space sharing apps (317) for a head-mounted display (HMD) worn by a remote participant are configured to receive, decode, and display the "teleported" holographic and physical mixed-reality (HPMR) casino space as a live stream, which represents the real-time holographic instance of the physical casino officiated and/or moderated by the casino dealer (301). In a typical mode of operation, the casino dealer (301) also wears an HMD to record, transmit, and visualize the HPMR casino space while officiating and/or moderating a casino event at the physical casino. In an alternate embodiment of the invention, the casino space sharing apps (317) may be executed by a smart phone or another mobile device carried by the remote participant, wherein the HPMR live casino environment is provided by the display screen of the mobile device instead of the HMD.

In the preferred embodiment of the invention, each instance of the casino space sharing apps (317) can activate or invoke a casino remote sharing session (319) per remote participant in the HPMR casino accommodation system, wherein each session provides a real-time remote HPMR casino space sharing for remote player participation (321) in a particular casino gameplay (e.g. poker, blackjack, roulette, etc.) occurring at the physical casino. In a typical mode of operation, the casino dealer (301) wearing the HMD officiates and moderates the particular casino gameplay for both in-person and remote participants simultaneously, as illustrated, for example, in FIG. 7. Furthermore, the casino space sharing apps (317) for head-mounted displays (HMDs) may be configured to operate in a mobile operating system environment (e.g. Android, IOS, Windows 10 Mobile, etc.) executed by application processors, CPUs, and memory units incorporated in head-mounted displays (HMDs), smart phones, tablet computers, or other mobile electronic devices utilized by remote participants.

As illustrated by the system block diagram (300) in FIG. 3, the remote participant (309) can achieve "remote visiting" of the physical casino by immersing into the real-time holographic and physical mixed-reality (HPMR) environment with holographic objects and structures that mirror physical objects and structures at the physical casino. The real-time HPMR casino environment is typically visualized through a head-mounted display (HMD) that executes the casino space sharing app (317). In the preferred embodiment of the invention, the real-time HPMR casino environment is experienced at the comfort of the remote participant's local space (e.g. living room, backyard, vacation property, etc.), where the physical structures of the remote participant's local space are typically also visible through the HMD, when the holographic objects and structures from the physical casino are displayed in the HMD, as the system is capable of providing a uniquely "mixed-reality" perspective, as opposed to an entirely-synthetic (i.e. virtual reality) perspective. Optionally, the remote participant (309) or the system operator may choose to visualize the real-time holographic casino environment of the physical casino without an infusion of the physical objects in the remote visitor's physical space.

Figure 4:
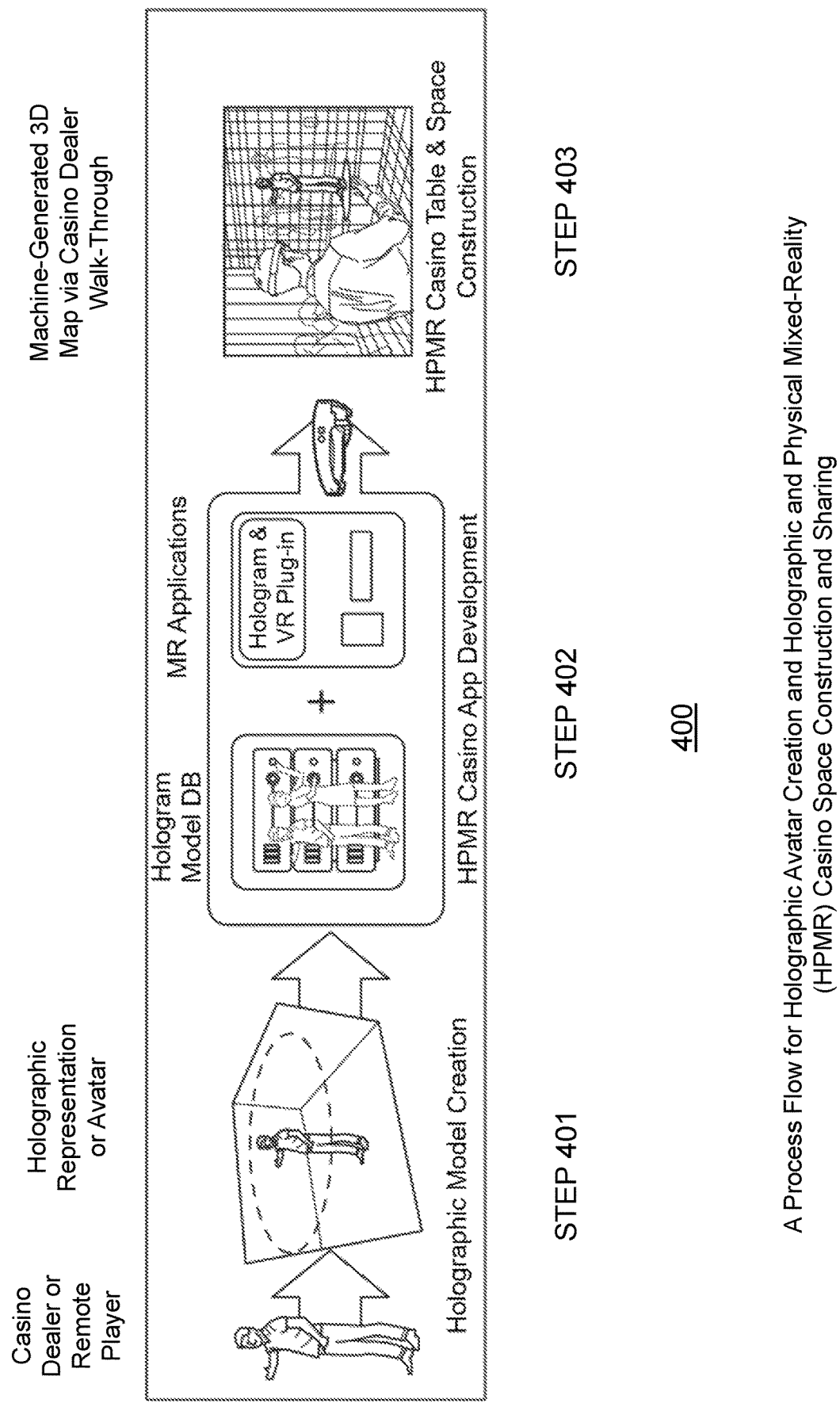
FIG. 4 shows a process flow for holographic avatar creation and holographic and physical mixed-reality (HPMR) casino space construction and sharing, in accordance with an embodiment of the invention.

FIG. 4 shows a process flow (400) for holographic avatar creation and holographic and physical mixed-reality (HPMR) casino space construction and sharing, in accordance with an embodiment of the invention. As shown in the process flow (400) diagram, STEP 401 shows the holographic avatar creation, wherein each holographic avatar potentially represents a casino dealer or a remote player/participant to a casino game event. In case of humans represented by holograms in the HPMR live casino environment, a holographic avatar that represents each individual (e.g. a casino dealer, an in-person participant, a remote participant, a bystander, etc.) may be a visually-similar holographic manifestation of that individual in one embodiment, or a visually-different holographic manifestation of that individual for privacy protection, in an alternate embodiment of the invention. In case of the alternate embodiment of the invention with the visually-different holographic manifestation of that individual for privacy protection, each individual may have an option to choose a particular avatar from an existing library of avatars available for visualization by participants in the HPMR live casino environment.

Once the holographic model creation is executed in STEP 401 in multiple instances and iterations for various human participants, the HPMR casino accommodation system is able to accumulate a collection of 3D holographic avatars to constitute a hologram model database) as part of the HPMR casino app development, as shown in STEP 402. This process involves creating and managing a hologram model database and mixed-reality (MR) applications that incorporate holograms and virtual reality plug-in components. The virtual reality plug-in components in MR applications, with user-selected hologram models and objects, enable generation of a graphically-immersive and interactive mixed-reality environment simulating the physical casino and related casino events, wherein the graphically-immersive and interactive mixed-reality environment is typically superimposed as a mixed-reality artificial layer, from the perspective of a remote participant and a casino dealer visualizing the MR environment through head-mounted displays (HMDs).

In the preferred embodiment of the invention, the HPMR casino app development process (STEP 402) also involves proprietary or standardized holographic data compression of the digitized holographic model content (e.g. holographic avatars for casino dealers, remote participants, in-person participants, mixed-reality objects, etc.). In one example, the digitized holographic model content can be compressed and sub-divided as an object (OBJ) file and a digital asset exchange (DAE) file, wherein the OBJ file contains compressed multi-angle graphics data representing a particular holographic model, and wherein the DAE file contains digital graphics compatibility schemes and/or information, typically based on COLLADA (collaborative design activity) XML schema or another industry-standardized graphics compatibility scheme.

Then, the compressed holographic model content files (e.g. OBJ and DAE files) can be utilized by one or more holographic app and service toolkits, such as WebGL, Unity, and Unreal Engine, by HPMR casino space content creators or HPMR casino experience designers to envision, generate, modify, and manage a variety of holographic casino applications and service offerings. In one embodiment, the HPMR casino app and service toolkits may be integrated into or operatively connected to a dealer and player experience choreography engine (e.g. 505) and a casino table and room map creation engine (e.g. 507) in an HPMR casino synthesis cloud module (e.g. 503 in FIG. 5) in the HPMR casino accommodation system.

As shown in the process flow (400) in FIG. 4, the HPMR casino table and space construction is performed by the HPMR casino accommodation system in STEP 403. In the preferred embodiment of the invention, the dealer and player experience choreography engine (e.g. 505 in FIG. 5) and the casino table and room map creation engine (e.g. 507 in FIG. 5) in the HPMR casino synthesis cloud module (e.g. 503 in FIG. 5) of the HPMR casino accommodation system synthesize a machine-generated 3D map of the casino space, casino event-related objects, and/or humanized holograms from images captured from the casino dealer's head-mounted mixed-reality recording device. Then, the newly-synthesized 3D map of the casino space can be stored and categorized in a 3D casino map database linked to the casino table and room map creation engine, while the casino event-related objects and/or humanized holograms associated with a particular casino event can be stored and categorized in a 3D casino event holographic database. The stored 3D holographic information in databases can be readily retrieved by the HPMR casino accommodation system to recreate an HPMR casino environment based on a recreation request by an authorized physical casino operator or a remote customer.

Figure 5:
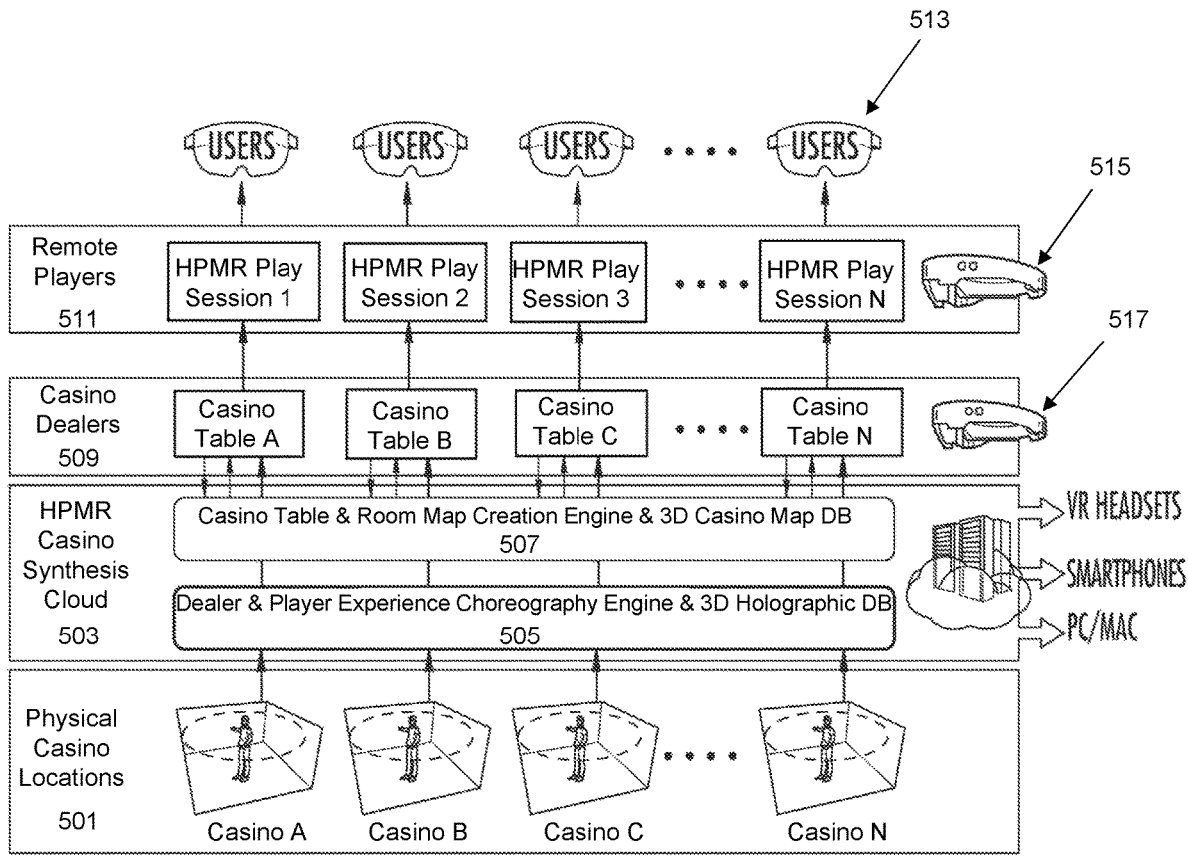
FIG. 5 shows a scalable system user interaction diagram for the holographic and physical mixed-reality (HPMR) casino accommodation system for multiple casino operators, in accordance with an embodiment of the invention.

FIG. 5 shows a scalable system user interaction diagram (500) for the holographic and physical mixed-reality (HPMR) casino accommodation system for multiple casino operators, in accordance with an embodiment of the invention. As illustrated in FIG. 5, the HPMR casino accommodation system is scalable to support a plurality of casino operators (i.e. Casino A, Casino B, Casino C, . . . , Casino N) in diverse physical casino locations (501). For example, "Casino A" and "Casino B" may be two separately-branded casino resorts operating in Las Vegas, while "Casino C" may be operating in Atlantic City. Likewise, "Casino N" may be an independent casino in Europe, unrelated to other casinos in the United States.

Each casino operator, as shown in the physical casino locations (501) section in the scalable system user interaction diagram (500) of FIG. 5, is electronically connected to the HPMR casino synthesis cloud module (503), which comprises a dealer and player experience choreography engine and 3D holographic database module (505) and a casino table and room map creation engine and 3D casino map database module (507), as illustrated in the scalable system user interaction diagram (500) for the HPMR casino accommodation system. The dealer and player experience choreography engine in the HPMR casino synthesis cloud module (503) allows an MR casino experience designer or a casino dealer to select a holographic object from the 3D holographic database and place the holographic object in a particular location of a 3D casino map comprising one or more MR artificial layers and virtual coordinates superimposed on a physical space.

Furthermore, the dealer and player experience choreography engine also allows the MR casino experience designer to create a series of prespecified or potential interactions, or "choreographies," between the holographic object and a remote participant, for certain casino events or gameplays. In the preferred embodiment of the invention, the holographic object may be a deck of cards, a dice, a blackjack/poker table, a roulette wheel, or another casino gameplay object that can be placed into a mixed-reality casino environment with one or more MR artificial layers and virtual coordinates superimposed on a physical space, which is typically the remote participant's residence or another convenient location for the remote participant external to the physical casino's location.

Moreover, the casino table and room map creation engine and 3D casino map database module (507) in the HPMR casino synthesis cloud module (503) enables the MR casino experience designer or the casino dealer to wear a head-mounted display (HMD) device and walk-through a targeted physical space of the physical casino, which in turn activates the casino table and room map creation engine in the HPMR casino synthesis cloud module (503) to intelligently and automatically generate a 3D casino map from visual information gathered by the HMD. This intelligent machine-generated 3D casino map can be utilized as a mixed-reality artificial layer with virtual coordinates superimposed on the targeted physical space, and stored in the 3D casino map database in the HPMR casino synthesis cloud module (503).

In the preferred embodiment, the HPMR casino synthesis cloud module (503) is a 3D graphics-generating software element for the casino table and room map creation engine and for the dealer and player experience choreography engine, as shown in the scalable system user interaction diagram (500) in FIG. 5. The HPMR casino synthesis cloud module (503) also incorporates or connects to 3D casino map and 3D holographic relational databases (DBs) as dynamic storages of 3D casino maps and holograms (e.g. casino gameplay objects, furniture, human avatars, etc.) generated by the 3D graphics-generating software element. Typically, the HPMR casino synthesis cloud module (503) is executed by a scalable number of CPUs, GPUs, and memory units in one or more high-performance cloud-networked computer servers suited for 3D graphics processing. The HPMR casino synthesis cloud module (503) is also operatively connected to the physical casino locations (501), HMDs (517) worn by a plurality of casino dealers (509), each of whom is responsible for a casino table (e.g. Casino Table A, B, C, . . . . N), and HMDs (513, 515) worn by a plurality of remote players (511), each of whom is immersed in the HPMR live casino environment through an HPMR play session (e.g. HPMR Play Session 1, 2, 3, . . . , N).

In one embodiment of the invention, the digitized holographic model content stored in the 3D holographic database in the HPMR casino synthesis cloud module (503) can be compressed and sub-divided as an object (OBJ) file and a digital asset exchange (DAE) file, wherein the OBJ file contains compressed multi-angle graphics data representing a particular holographic model, and wherein the DAE file contains digital graphics compatibility schemes and/or information, typically based on COLLADA (collaborative design activity) XML schema or another industry-standardized graphics compatibility scheme.

Then, the compressed holographic model content files (e.g. OBJ and DAE files) can be utilized by one or more holographic app and service toolkits, such as WebGL, Unity, and Unreal Engine, by the HPMR casino content creators/mixed-reality experience designers to envision, generate, modify, and manage a variety of HPMR casino applications and service offerings. In context of the scalable user interaction diagram (500) in FIG. 5, the holographic app and service toolkits may be integrated into or operatively connected to the dealer and player experience choreography engine and the casino table and room map creation engine in the HPMR casino synthesis cloud module (503) in the HPMR casino accommodation system.

The scalable system user interaction diagram (500) for the HPMR casino accommodation system in FIG. 5 also incorporates the HMDs (513, 515) worn by the plurality of remote players (511), wherein each HMD (513, 515) worn by a remote player executes one or more software sub-modules in a CPU, a GPU, and/or a memory unit of each HMD (513, 515) worn by each remote player. In another embodiment, another portable electronic device (e.g. a smart phone, a table computer, etc.) capable of displaying mixed-reality environments via camera-enabled mobile applications may be utilized by a remote player instead of an HMD. Preferably, each HMD (513, 515) worn by a remote player incorporates a remote participant's mixed-reality visualization interface and an HPMR play session (e.g. HPMR Play Session 1, 2, 3, . . . , N) executed and displayed by one or more portable electronic devices utilized by the remote player.

Furthermore, in one embodiment of the invention, the HPMR casino accommodation system may also incorporate a holographic mixed-reality browser and a third-party holographic application loader that are configured to load and display various holographic third-party casino apps by connecting to and downloading various software applications from a cloud-connected computer server, which executes a third-party holographic casino application database and a casino-related hologram software development kit (SDK) for implementation and deployment of various holographic casino applications that can be utilized in HPMR environments. In one instance, "third-party" refers to an independent group of holographic casino app developers who are not hired or managed by the HPMR casino accommodation system operators, physical casino owners, and/or physical casino dealers.

FIG. 6 shows an example (600) of a remote physical player (605) visualizing a holographic casino environment (i.e. 601, 603 shown with perforated lines) created by the holographic and physical mixed-reality (HPMR) casino accommodation system, in accordance with an embodiment of the invention. In this example (600), the remote physical player (605) is standing in his/her living room (609) and visualizing a casino dealer's holographic avatar (601) and a holographic casino table (603) through a head-mounted display (HMD) device (607), while also being able to view physical objects and features of his/her living room (609), such as curtains on a window, a fireplace, a wall-mounted television, and other home furniture and decorations. Therefore, the resulting "mixed" visualization of the holographic avatars and objects, which are virtually teleported from the physical casino, and the physical objects and features of the remote physical player's living room (609), creates a unique holographic and physical mixed-reality (HPMR) casino environment to the remote physical player (605).

Optionally, if privacy settings allow the in-person players at the physical casino table to be viewable by the remote physical player (605), then such in-person players may also be holographically visualized by the remote physical player, as shown in the example (600) in FIG. 6. Each remote player is typically engaged in one particular HPMR play session that connects to the remote player-selected casino event and the remote player-selected casino dealer, as previously illustrated in FIG. 5. Therefore, a scalable multiple number of individualized HPMR play sessions may be activated concurrently, depending on the number of remote players participating in one or more casino events provided by one or more physical casinos connected to the HPMR casino accommodation system.

FIG. 7 shows an operational example (700) of holographic and physical mixed-reality (HPMR) casino accommodation system and method in a remote player's house and a physical casino, in accordance with an embodiment of the invention. As shown in this operational example (700) of the HPMR casino accommodation system, a remote physical player (701) is sitting on a couch at his/her house (711) while visualizing a casino dealer's holographic avatar (703') and a holographic casino table (705'), which directly mirror live action from a physical casino (713). As illustrated in this operational example (700), the casino dealer (703) is physically standing in front of the physical casino table (705) at the physical casino (713) and is officiating a casino game to in-person participants (707, 709) and the remote player's holographic avatar (701') simultaneously.

As depicted in FIG. 7, in this operational example (700), the computer-generated visualization of the casino dealer's holographic avatar (703') for the remote physical player (701) is achieved through the remote physical player's head-mounted display (HMD) device, while the computer-generated visualization of the remote player's holographic avatar (701') for the casino dealer (703) is achieved through the casino dealer's head-mounted display (HMD) device. In the preferred embodiment of the invention, the holographic casino table (705') reflects all aspects of real-time gameplay changes and updates to mirror physical action occurring at the physical casino table (705) at the physical casino (713). Furthermore, any gameplay-related actions taken by the remote physical player (701) on the holographic casino table (705') are also immediately reflected in the HPMR environment visualized by the casino dealer (703) at the physical casino table (705) through the casino dealer's head-mounted display (HMD) device.

FIG. 8 shows a method (800) of operating the holographic and physical mixed-reality (HPMR) casino accommodation system, in accordance with an embodiment of the invention. It is important to note that as previously illustrated in and described for FIG. 3, activation and creation of an HPMR live casino environment and related holographic user interfaces are performed and executed by the HPMR live casino environment sharing platform (i.e. 303, 305, 307 in FIG. 3) that synthesizes a computerized holographic casino space comprising interior casino structures, casino tables, and casino gameplay objects, which holographically mirror a current casino event at a chosen physical casino in real time. Furthermore, multiple instances of activations and creations of one or more HPMR live casino environments can also be provided and managed by the HPMR casino accommodation system by deploying a scalable system structure with the HPMR casino synthesis cloud (i.e. 503, 505, 507 in FIG. 5), as illustrated in and described previously for FIG. 5.

As for the exemplary method (800) of operating the holographic and physical mixed-reality (HPMR) casino accommodation system as shown in FIG. 8, a remote participant/player sits on a couch at his/her house, and activates and logs into a holographic user interface to select an HPMR casino application, as shown in STEP 801. The HPMR casino accommodation system, in turn, is activated for the remote player and a holographic cube environment is initialized and superimposed on the remote player, as shown in STEP 802.

Then, the holographic user interface associated with the HPMR casino application executed by the HPMR casino accommodation system allows the remote player to choose a privacy-protecting humanized hologram as the remote player's privacy-protecting avatar, as shown in STEP 803. In the preferred embodiment of the invention, the privacy-protecting humanized hologram does not visually resemble the remote player, and is chosen from an existing library of generic humanized holograms, which were made available to the HPMR casino accommodation system previously. By ensuring the appearance of the remote player's privacy-protecting avatar to be substantially different from the real appearance of the remote player, the HPMR casino accommodation system can prevent other remote players, in-person players, and in some instances, even casino dealers from recognizing the real-life appearance of the remote player.

For many potential remote players participating in casino events in a physical casino, this privacy-protecting feature with an artificial layer of privacy-protecting avatar selection process may increase the appeal and the likelihood of remote participation to such casino events. In an alternate embodiment of the invention, the remote player may prefer his/her holographic representation to resemble his/her actual appearance for an added realism in the HPMR casino environment. In such cases, the HPMR casino accommodation system can provide a holographic 3D model creation stage (e.g. STEP 401 in FIG. 4) to the remote player in the holographic user interface to generate a holographic look-alike representation of the remote player, instead of utilizing a privacy-protecting avatar.

Yet in another embodiment of the invention, the remote player may be required to provide the holographic look-alike representation of himself/herself to a casino dealer for identification and fraud prevention purposes, when visualized by the casino dealer in an HPMR live casino environment, while still retaining the system's unique privacy protection capability for the remote player against other remote or in-person players attending the same casino event by enabling the remote player to choose a privacy-protecting avatar that does not resemble the real appearance of the remote player, when visualized by other remote or in-person players immersed in the HPMR live casino environment.

Once a holographic representation is chosen by the remote player, as shown in STEP 803, the HPMR casino accommodation system enables the remote player to select a desirable physical casino among a plurality of physical casino choices in the holographic user interface generated within the initial holographic cube environment, as shown in STEP 803 and STEP 804. After a particular physical casino is chosen by the remote player, a physical casino dealer is now empowered to visualize the remote player's holographic avatar at a physical casino table officiated or moderated by the physical casino dealer, as shown in STEP 805. Typically, the physical casino dealer wears a head-mounted display (HMD) device to visualize the remote player's holographic avatar, while also visualizing all physical people and physical objects at the physical casino table, as illustrated in STEP 805 in FIG. 8. The intermixture of visualization of both holographic and real objects and people by the physical casino dealer at the physical casino constitutes a dealer's visual perspective of the HPMR live casino environment synthesized by the HPMR casino accommodation system.

Continuing with the method (800) of operating the HPMR casino accommodation system, the remote player sitting at the couch at his/her house is now also empowered to visualize the casino dealer's holographic avatar as well as a holographic casino venue comprising gameplay-related objects, casino table(s), furniture at the casino table(s), and optionally, in-person casino players or spectators, as illustrated in STEP 806 in FIG. 8. Preferably, the remote player's earlier visualization of the initial holographic cube environment is smoothly transitioned to visualizing the casino dealer's holographic avatar and the holographic casino venue, after the remote player chose the particular physical casino in STEP 804. Furthermore, all elements of the holographic casino venue visualized by the remote player sitting at the couch of his/her house directly mirror real-time physical elements present at the physical casino.

Typically, the remote player wears a head-mounted display (HMD) device to visualize the casino dealer's holographic avatar as well as the holographic casino venue comprising gameplay-related objects, casino table(s), furniture at the casino table(s), and optionally, in-person casino players or spectators, as illustrated in STEP 806 in FIG. 8. The intermixture of visualization of the holographic casino venue and real objects located in the remote player's house constitutes a remote player's visual perspective of the HPMR live casino environment, wherein the remote player's visual perspective and the dealer's visual perspective of the HPMR live casino environment synthesized by the HPMR casino accommodation system are perceptively distinct yet synchronized in real time During the operation of the HPMR live casino environment, these two distinct visual perspectives (i.e. the remote player's visual perspective and the dealer's visual perspective) remain synchronized in real time by the HPMR casino accommodation system to enable the remote player to experience immersive and three-dimensional (3D) live casino gameplay interactions, which are moderated or officiated by the casino dealer at the physical casino. In some embodiments of the invention, the remote player may also visualize in-person players at the physical casino, and play against or interact with the in-person players in the HPMR live casino environment. In such instances, the in-person players may also each wear head-mounted display (HMD) device, select a holographic avatar to represent himself/herself, and visualize physical objects and people at the physical casino as well as one or more remote players, who are represented as holograms in the HPMR live casino environment.

Various embodiments of a holographic and physical mixed-reality (HPMR) casino accommodation system and related methods of operating such a system described herein provide significant and unique advantages to conventional ways of accessing physical or online casinos. For example, one advantage of the HPMR casino accommodation system and method is enabling real-time and live mixed-reality casino environment sharing between a casino dealer working at a physical casino event and remote participant(s) via two-way, bilateral real-time holographic visualizations, wherein the first way involves each remote participant visualizing the casino dealer and the physical casino event in real time as holograms, and the second way involves the casino dealer working at the physical casino event visualizing selected remote participants as holograms in real time.

Furthermore, another advantage of the HPMR casino accommodation system and method is enabling real-time interactivity and visualizations among remote participants and physical visitors gathered around the same physical casino event for the remote participants' added immersive customer experience, wherein each remote participant and each physical visitor can visualize each other in real time, as if they are gathered around the same physical casino event together in person.

In addition, another advantage of the HPMR casino accommodation system and method is improving customer convenience, customer participation rates, and cost efficiencies of operating a physical casino by graphically synthesizing a holographic and physical mixed-reality (HPMR) casino space that can be visualized in real time by casino dealers, remote participants, and physical visitors for immersive and interactive casino event participation and gameplay.

Moreover, another advantage of the HPMR casino accommodation system and method is providing an immersive mixed-reality visualization of real physical and holographic elements in a designated real physical space of a remote player or a physical casino.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. A method of operating a holographic and physical mixed-reality (HPMR) casino accommodation system, the method comprising the steps of:

activating a holographic user interface to a remote player wearing a first mixed-reality head-mounted display (HMD);

prompting the remote player to log into the holographic user interface to select an HPMR casino application, which in turn activates the HPMR casino accommodation system for the remote player and initializes a holographic cube environment;

from a visual perspective of the remote player wearing the first mixed-reality HMD, superimposing the holographic cube environment on the remote player located outside of any physical casinos;

allowing the remote player, via the holographic user interface, to choose a privacy-protecting humanized hologram as a privacy-protecting holographic avatar of the remote player;

allowing the remote player, via the holographic user interface, to select a desirable physical casino among a plurality of physical casino choices in the holographic user interface visualized within the holographic cube environment;

activating a dealer's visual perspective of an HPMR live casino environment for a casino dealer wearing a second mixed-reality HMD at the desirable physical casino to visualize the privacy-protecting holographic avatar of the remote player participating at a physical casino table, which is officiated by the casino dealer, wherein the casino dealer simultaneously visualizes the privacy-protecting holographic avatar of the remote player as well as physical people and physical objects at the physical casino table through the second mixed-reality HMD; and activating a remote player's visual perspective of the HPMR live casino environment for the remote player wearing the first mixed-reality HMD, wherein the activation of the remote player's visual perspective empowers the remote player to visualize a holographic avatar of the casino dealer, a holographic version of the physical casino table, holographic versions of the physical objects at the physical casino table, and local physical objects at a location of the remote player, which is outside of any physical casinos.

2. The method of claim 1, further comprising a step of synchronizing the dealer's visual perspective and the remote player's visual perspective of the HPMR live casino environment in real time to accommodate live casino gameplay between the remote player and the casino dealer through the first mixed-reality HMD and the second mixed-reality HMD.

3. The method of claim 1, further comprising a step of allowing the remote player's visual perspective of the HPMR live casino environment to visualize an in-person player at the physical casino table, if the in-person player authorized the HPMR casino accommodation system for holographic viewing by the remote player.

4. The method of claim 1, further comprising a step of providing a holographic look-alike representation of the remote player to the casino dealer for identification and fraud prevention, when viewed by the casino dealer in the HPMR live casino environment, while simultaneously providing privacy protection to the remote player against other remote and in-person players by enabling the remote player to be visually represented by the privacy-protecting humanized hologram that does not visually resemble an actual appearance of the remote player, when viewed in the HPMR live casino environment by the other remote and in-person players who are also moderated by the casino dealer.

5. The method of claim 1, wherein the holographic cube environment initialized by the HPMR casino accommodation system is seamlessly transitioned, upon activation, to incorporate the remote player's visual perspective of the HPMR live casino environment that includes the holographic avatar of the casino dealer, the holographic version of the physical casino table, and the holographic versions of the physical objects at the physical casino table.

6. The method of claim 1, wherein the privacy-protecting humanized hologram chosen by the remote player as the privacy-protecting holographic avatar of the remote player is selected from an existing library of generic humanized holograms stored in the HPMR casino accommodation system.

7. The method of claim 1, wherein the HPMR live casino environment provides real-time audio communication between the casino dealer and the remote player, and also between the remote player and one or more in-person players physically attending the physical casino table.

8. The method of claim 1, wherein the physical casino table is a blackjack table, a poker table, or a roulette table.

9. The method of claim 1, wherein the physical objects at the physical casino table are cards, dice, game chips, or roulette wheels.

10. The method of claim 1, wherein the location of the remote player is a room in a house or an office of the remote player, and wherein the local physical objects at the location of the remote player are home furniture and home decorations, including at least one of couches, curtains on a window, a fireplace, and a wall-mounted television.

* * * * *